United States Patent Office 3,567,478
Patented Mar. 2, 1971

3,567,478
PROCESS FOR IMPROVING PIGMENTARY
METAL OXIDES
Albert Dietz, Wadsworth, and Harry Lott, Jr., Akron, Ohio, assignors to PPG Industries, Inc., Pittsburgh, Pa.
No Drawing. Filed July 6, 1965, Ser. No. 469,864
Int. Cl. C01g 23/04; C09c 1/36
U.S. Cl. 106—300
17 Claims

ABSTRACT OF THE DISCLOSURE

Pigmentary metal oxides, particularly titanium dioxide, are prepared by vapor phase oxidation of corresponding metal halides. A method for wet treating raw metal oxide to improve pigmentary properties is described. The process comprises digesting an aqueous slurry consisting essentially of such oxide at pH levels below 2.0 and at temperatures of from 50° C. to the boiling point of the slurry for a period of time sufficient to reduce the surface activity of the raw metal oxide.

This invention relates to a process for wet treating raw pigmentary metal oxide. More particularly, this invention relates to a process for wet treating metal oxide, notably titanium oxide, produced by the vapor phase oxidation of a metal halide and significantly improving the pigmentary properties thereof.

Titanium oxide is currently produced commercially by two processes, the chloride process and the sulfate process.

The chloride process involves the vapor phase oxidation or hydrolysis of at least one titanium halide selected from the group consisting of titanium chloride, titanium bromide, and titanium iodide, e.g., $TiCl_4$, $TiBr_4$ and $TiI_4$.

Typical chloride processes are described in U.S. Letters Patents 2,450,156 to Pechukas; 2,502,347 to Schaumann; 2,653,078 to Lane; 2,750,260 to Nelson et al.; 2,791,490 to Willcox, 2,670,275 to Olson et al.; 2,805,921 to Schaumann; 2,847,316 to Michel et al.; 2,823,982 to Saladin et al.; 2,937,928 to Hughes et al.; 2,968,529 to Wilson; 2,980,509 to Frey; 3,024,089 to Spencer et al.; 3,068,113 to Strain et al.; 3,069,281 to Wilson; 3,069,282 to Allen; and 3,130,008 to Stokes et al.; British Patent 876,672; and Canadian Patent 662,785. Likewise, a vapor phase oxidation process may be conducted within a fluidized bed process as disclosed in U.S. Letters Patents 2,760,846 to Richmond; 2,856,264 to Dunn, Jr.; 2,964,386 to Evans et al.; 3,022,137 to Nelson; 3,036,926 to Hughes; 3,073,712 to Wigginton et al.; 3,097,923 to Walmsley.

Such vapor phase oxidation or chloride processes are readily distinguishable from the so-called sulfate processes as disclosed, for example, in U.S. Letters Patents 2,505,344; 2,766,133; 2,933,408; and 2,982,613.

A common characteristic of such sulfate processes is the recovery of the pigment from an acid slurry ($H_2SO_4$ or HCl) followed by calcination.

The practice of this invention is expressly limited to a vapor phase oxidation or chloride process.

In accordance with the practice of this invention, an aqueous slurry of raw metal oxide produced by the vapor phase oxidation of a metal halide is digested at a low pH and high temperature for a period of time sufficient to convert adsorbed impurity on the pigment surface to a soluble salt.

The adsorbed impurity may be a cation such as oxyhalides of nucleating and/or rutile promoting agents added to the vapor phase reaction. Typical of such agents are compounds or ions of metals such as silicon, aluminum, zinc, potassium, titanium, thorium, zirconium, yttrium, ytterbium, sodium, rubidium, boron, cesium, nickel, calcium, barium, strontium, cadmium, magnesium, and beryllium.

Thus, where $TiCl_4$ is reacted in the vapor phase with oxygen in the presence of metal halides such as $SiCl_4$ and $AlCl_3$, the resulting $TiO_2$ pigment surface may contain adsorbed oxychlorides of silicon and aluminum.

The presence of the impurity on the raw pigment surface gives rise to surface acidity which may cause individual pigment particles to agglomerate with a decrease in over-all pigment properties.

It has been discovered that when raw pigment produced by the vapor phase oxidation of at least one metal halide is treated in accordance with the present invention by digestion at a low pH and a high temperature, the pigmentary properties of the pigment are significantly improved.

More particularly, it has been discovered that the practice of this invention results in a higher pKa value (lower or neutral pigment surface acidity), less pigment agglomeration, increased pigment dispersion, increased tinting strength, improved tint tone (or undertone), increased tint efficiency, and a stable slurry pH, particularly in the pH range of 6.0 to 8.0.

Raw pigment, particularly raw titanium dioxide pigment, as used herein, is defined as a pigment (produced by a vapor phase oxidation process) which has had its chemical composition substantially unaltered.

Thus, a pigment after withdrawal from a vapor phase oxidation or hydrolysis zone may be physically treated, e.g., by milling, grinding, hydroseparating, filtering, without changing the basic chemical composition of the pigment. Such pigment is defined herein as a raw pigment.

A raw pigment is therefore to be distinguished from a finished pigment, the latter being a pigment which has been given an organic and/or inorganic coating or treatment as disclosed, for example, in U.S. Letters Patents 2,604,823 to Johnson, 2,717,246 to Kienle et al.; 2,721,853 to Eastes et al.; 3,146,119 to Dr. Hartien S. Ritter.

In the preferred embodiment of this invention, raw rutile titanium dioxide pigment is digested at a low pH below 3.0, preferably not greater than 2.0. Ideally, the digestion is at a pH of 0.1 to 0.8.

The digestion is conducted at a temperature of 50° C. up to the boiling point of the aqueous slurry, preferably 70 to 95° C., ideally above 80° C., for a period of time sufficient to digest pigment surface impurities, preferably at least 30 minutes, usually about one hour.

The pH of the slurry is then adjusted and raised to a pH of 6.5 to 7.5 by the addition of a selected base such as urea, ammonia, sodium hydroxide, sodium carbonate, or mixtures thereof, and further digested, e.g., at a temperature of 50° C. up to the boiling point for at least 30 minutes. The slurry may then be filtered, the pigment filter cake washed, the cake dried, and milled.

In a further embodiment, the filter cake is repulped and reslurried, and an inorganic or organic agent added to the slurry to treat the pigment. The slurry is again filtered with the cake being washed and dried. The dried pigment may finally be hot milled or micronized (with steam or an inert gas such as nitrogen) before being bagged.

In another embodiment, the raw pigment slurry is digested at a high temperature and low pH, e.g., at a pH below 3.0 and at a temperature above 50° C., for a sufficient period of time. Metal salts are then added to the low pH slurry in an amount sufficient to form a coating of hydrous oxide of the metals upon the pigment.

Thus, where the pigment is to be wet coated in accordance with the acid pH process invention of Dr.

Hartien S. Ritter, as disclosed in U.S. Letters Patent 3,146,119, soluble salts of titanium and aluminum (e.g., $TiCl_4$ and aluminum chloride or sulfate) are added to the low pH slurry subsequent to the digestion period. Likewise, as disclosed by Doctor Ritter, a silicon salt such as sodium silicate may be added in addition to the aluminum and titanium salts. The slurry is then gradually adjusted in pH with a base, e.g., $NH_3$, to a pH range of 6.5 to 7.8. A gradual adjustment in pH is necessary in order to prevent overly rapid pigment flocculation and precipitation of hydrous oxide upon the pigment. After the slurry has been raised to a pH of 6.5 to 7.8, it is digested again at a temperature above 50° C. and then filtered, washed, dried, and milled.

In a further embodiment of this invention, the raw pigment is digested at a low pH below 3.0 and at a temperature above 50° C. The slurry is then adjusted to an alkaline pH range above 10.5 and the pigment is wet coated in accordance with the invention of Dr. Neil C. Goodspeed, as disclosed in U.S. application Ser. No. 370,349, filed May 26, 1964, now abandoned.

In still a further embodiment, pigment is digested and coated by the Ritter process or Goodspeed process noted hereinbefore, the coated pigment then being given an organic treatment by the addition of organic additives to the slurry. Likewise, the coated pigment may be filtered, washed, repulped, slurried, and then treated with organic additives.

When raw pigment is treated by this invention, the finished treated pigment characteristically has increased dispersion, for example, as determined by electron micrographs.

The pigment also has increased tinting strength and tint tone.

Tinting strength may be determined in accordance with A.S.T.M. D-332-26, "1949 Book of A.S.T.M. Standards," Part 4, page 31, published by American Society for Testing Material, Philadelphia 3, Pennsylvania.

Tint tone or undertone of a $TiO_2$ pigment sample may be determined by visually comparing a paste of the pigment with a paste of a selected standard. The paste of each sample and standard is prepared in accordance with A.S.T.M. D-332-26 using carbon black to tint each sample paste to the same depth of grey as the standard. The standard used herein has an oil absorption rating of 20.9 as determined by A.S.T.M. D-281-31, an average particle size of 0.25 micron, as determined with an electron micrograph, and an assigned undertone or tint tone value of Blue 2. The sample is then compared with the standard and an undertone value assigned to the sample by stating whether the sample is bluer or browner than the standard.

The more blue a pigment is, the more pleasing are the optical properties of a paint prepared with the pigment. Conversely, the more brown the pigment, the less pleasing the optical properties of the paint.

The undertone scale used herein ranges from a Brown 10 to a Blue 6 as shown in Table I hereinafter.

TABLE I

| | |
|---|---|
| Brown 10 | Brown 1 |
| Brown 9 | Neutral |
| Brown 8 | Blue 1 |
| Brown 7 | Blue 2 (Standard) |
| Brown 6 | Blue 3 |
| Brown 5 | Blue 4 |
| Brown 4 | Blue 5 |
| Brown 3 | Blue 6 |
| Brown 2 | |

As noted hereinbefore, this invention also improves the pKa value of pigment surface.

The term, pKa, as used herein, refers to the change of color of certain indicator dyes as the result of interaction with a solid surface, as disclosed by H. A. Benesi in his article, "Acidity of Catalyst Surfaces," published in the Journal of the American Chemical Society, 78, 5490, (1956).

pKa is thus a measure of the base strength of the indicator. If the base strength of the indicator is high, a weak acid or weak surface activity is necessary to cause a color change. A low base strength of the indicator requires a strong acid or strong surface activity to produce a color change.

The pKa of a pigment is an indirect measure of its wetting properties and its tendency to agglomerate, particularly in organic vehicles. It is highly desirable that the pigment have a high positive pKa value and a neutral or low surface acidity.

The pKa scale as used herein is given in Table II.

TABLE II

| | Description | $H_2SO_4$ equivalent, percent by weight |
|---|---|---|
| pKa Range: | | |
| +6.8, +4.0 | Neutral | $8 \times 10^{-8} - 5 \times 10^{-6}$ |
| +4.0, +3.3 | Mildly acidic | $5 \times 10^{-6} - 3 \times 10^{-4}$ |
| +3.3, +1.5 | Acidic | $3 \times 10^{-4} - 0.02$ |
| +1.5, -3.0 | Very acidic | 0.02-48 |
| -3.0, -5.6 | Extremely acidic | 48-71 |
| -5.6, -8.2 | Very extremely acidic | 71-90 |

NOTE.—The pKa range of 4.0 to 6.8 is thus written +6.8, +4.0.

Typical pKa indicators are given in Table III.

TABLE III

| Indicator | | Basic Color | Acid Color |
|---|---|---|---|
| pKa: | | | |
| +6.8 | Neutral Red | Yellow | Red. |
| +4.0 | Phenylazonaphthylamine | do | Red. |
| +3.3 | Butter Yellow | do | Red. |
| +1.5 | Benzeneazodiphenylamine | do | Purple. |
| -3.0 | Dicinnamalacetone | do | Red. |
| -5.6 | Benzalacetophenone | Colorless | Yellow. |
| -8.2 | Anthraquinone | do | Do. |

When raw titanium dioxide pigment is produced by the vapor oxidation of a titanium tetrahalide such as $TiCl_4$, it has a highly acidic surface corresponding to a pKa value of less than −3.0. However, when such pigment is treated in accordance with the practice of this invention, the pKa value of the raw digested pigment is increased to at least +4.0, +3.3. When the raw pigment is digested and coated with hydrous oxides, the finished pigment has a pKa of +6.8, +4.0.

When raw titanium oxide is not digested at a low pH and high temperature in accordance with this invention, it characteristically has an unstable slurry pH. This is a disadvantage in the preparing of paints wherein a stable pH is required, particularly in the range of 6.5 to 7.5. when the raw pigment is treated in accordance with this invention, an aqueous slurry of the pigment does have the necessary pH stability within the necessary range.

This invention further increases the tint efficiency of the titanium oxide pigment.

Tint efficiency as used herein refers to the reflectometry method disclosed on pages 704 to 715, volume 34, Journal of Paint Technology and Engineering (Official Digest, July 1962).

A standard common commericial type enamel paint is prepared out of a known amount of a standard pigment, vehicle, and colorant (tint).

An enamel paint is also prepared from the sample pigment, and compared with the standard using a reflectometer.

Pigments treated in accordance with the embodiments of this invention typically have a tint efficiency of at least 98 percent, usually 100 percent that of the standard as measured with a reflectometer.

Raw titanium dioxide pigment produced by the vapor phase oxidation of $TiCl_4$ characteristically has a low tint efficiency. Often raw pigment will float or flood such that its tint efficiency cannot be determined. Floating or flooding is where the pigment floats to the top of the paint film and/or the tint has flocculated to the bottom of the film.

The following are typical working examples, representing the best mode contemplated by the inventors in the carrying out of this invention.

EXAMPLE I

Titanium tetrachloride ($TiCl_4$) was reacted in the vapor phase with oxygen in the presence of aluminum trichloride ($AlCl_3$) and silicon tetrachloride ($SiCl_4$) to produce a raw titanium oxide pigment containing about 1.93 percent by weight $Al_2O_3$ and about 0.56 percent by weight $SiO_2$, basis the weight of the titanium oxide pigment.

An aqueous slurry containing 20 percent by weight of the titanium oxide, basis the total weight of the slurry, was prepared and adjusted with $H_2SO_4$ from a pH of about 4.2 to a pH of 0.5.

The slurry was digested at 85° C. for 1.5 hours. Throughout the digestion, the slurry was maintained at a pH of 0.5 by the addition of $H_2SO_4$.

Ammonia ($NH_3$) was then added to the slurry during a two-hour period to adjust the slurry to a pH of 6.5.

Sodium carbonate ($Na_2CO_3$) was then added to adjust the slurry pH to 7.2 and the slurry digested at 85° C. for one hour.

At the end of the one-hour digestion period, the slurry pH was still 7.2.

The slurry was filtered. The resulting titanium oxide filter cake was washed with water of all salts until the cake had a specific resistance in excess of 10,000 ohms. The cake was then dried over night in an oven at 65 to 70° C.

The pigment cake was again slurried in water (10 percent by weight titanium oxide, basis the weight of the slurry). The pH of the slurry was found to still be 7.2

EXAMPLE II

The raw slurry of Example I containing 20 percent by weight titanium oxide and having a pH of 4.2 was digested at 85° C. for 1.5 hours, during which the pH dropped to 3.4.

The slurry was adjusted to 7.1 with NaOH and digested at 85° C. After 15 minutes digestion, the slurry pH had dropped to 6.85. During a three-hour digestion period at 85° C., the pH varied between 6.6 and 6.8.

The slurry was filtered and the cake washed to a specific resistance in excess of 10,000 ohms. After drying over night in an oven at 65 to 70° C., the pigment cake was slurried in water (as in Example I) and found to have a pH of 8.8.

EXAMPLE III

Titanium tetrachloride ($TiCl_4$) was reacted in the vapor phase with oxygen in the presence of $AlCl_3$ and $SiCl_4$ to produce titanium oxide pigment containing about 1.80±0.15 percent by weight $Al_2O_3$ and about 0.56±.05 percent by weight $SiO_2$, basis the weight of the titanium oxide pigment.

The raw titanium oxide pigment had a tinting strength of 1750, a neutral undertone or tint tone, a pKa of −3.0, −5.6, and an oil absorption of 17.7.

The raw titanium oxide pigment was slurried in water to a concentration of about 20 percent by weight pigment basis the total weight of the slurry.

The slurry was adjusted with $H_2SO_4$ from a pH of about 4.3 to a pH of about 0.5, and digested at about 85° C. for 1 hour and 33 minutes. The slurry was maintained at a pH of about 0.5 throughout the digestion by the addition of $H_2SO_4$.

Gaseous $NH_3$ was then added to the slurry during a 90-minute period to adjust the ph to 6.5, and the slurry further digested for one hour. At the end of the digestion, the slurry pH was 6.3.

The slurry was filtered. The resulting titanium oxide filter cake was washed with 16 displacements of water to remove all salts. The pigment was then dried over night at 65° C. and evaluated.

The dry digested pigment had a tinting strength of 1780, a tint tone of Blue 1, a pKa of +4.0, +3.3, and an oil absorption of 18.6. An aqueous slurry of the pigment had a pH of 6.5, about the same as the slurry pH subsequent to the final digestion.

EXAMPLE IV

Titanium tetrachloride ($TiCl_4$) was reacted in the vapor phase with oxygen in the presence of $AlCl_3$ and $SiCl_4$ to produce a raw titanium oxide pigment containing 1.80±.15 percent by weight $Al_2O_3$ and 0.56±0.05 percent by weight $SiO_2$, basis the weight of the titanium oxide pigment.

The raw titanium oxide pigment has a tinting strength of 1670, an undertone of Brown 1, and a pKa of −3.0, −5.6. A tint efficiency could not be determined for the raw pigment because the pigment floated.

An aqueous slurry was prepared containing 20 percent by weight of the titanium oxide pigment, basis the total weight of the slurry.

The slurry was adjusted with $H_2SO_4$ from a pH of about 4.4 to about 0.5 and digested at 85° C. for 93 minutes. The slurry was maintained at a pH of about 0.5 throughout the digestion by the addition of $H_2SO_4$.

Gaseous $NH_3$ was added to the slurry during a period of 104 minutes to raise the pH gradually to 6.5. The slurry was again digested at 85° C. for 59 minutes. At the end of the digestion, the slurry pH was 6.2.

The slurry was filtered and the resulting titanium oxide filter cake washed with 16 displacements of water in order to remove salts. The cake was dried over night at 65° C.

The dry, uncoated titanium oxide pigment had a tinting strength of 1770, a neutral undertone, a pKa of +4.0, +3.3, and a tint efficiency of 105 percent. An aqueous slurry of the pigment had a pH of 5.8.

EXAMPLE V

Titanium tetrachloride ($TiCl_4$) was reacted in the vapor phase with oxygen in the presence of $AlCl_3$ and $SiCl_4$ to produce a raw titanium oxide pigment containing 1.80±0.15 percent by weight $Al_2O_3$ and 0.56±0.05 percent by weight $SiO_2$, basis the weight of the pigment.

The raw titanium oxide pigment had a tinting strength of 1670, an undertone of Brown 1, and a pKa of −3.3, −5.6.

An aqueous slurry containing 20 percent by weight of the titanium oxide, basis the total weight of the slurry, was prepared and adjusted with $H_2SO_4$ from a pH of about 4.0 to a pH of 0.6 at 26° C.

Sufficient $TiCl_4$ solution was added to coat the $TiO_2$ pigment surface with about 1.0 percent by weight hydrous $TiO_2$, basis the weight of the pigment, as taught by U.S. Letters Patent 3,146,119, and to adjust the pH of 0.4.

The slurry was then digested at 85 to 80° C. at a pH of 0.4 to 0.3 for 97 minutes.

$Al_2(SO_4)_3$ solution was then added to the slurry at a pH of 0.3, the sulfate solution being added in an amount sufficient to coat the pigment surface with about 1.2 percent by weight hydrous alumina, basis the weight of the pigment, as taught by U.S. Letters Patent 3,146,119.

The slurry was digested at 80 to 84° C. for 44 minutes during which period the slurry pH rose to about 4.8. The digestion was continued at 84 to 89° C. for 13 minutes with the slurry pH being adjusted to 7.3 with NaOH. The pH was finally adjusted to 7.6 with $Na_2CO_3$, digested for six minutes at 81° C. and filtered.

The acid pH wet coated pigment filter cake was washed and dried over night at 55° C. The dry coated pigment had a tinting strength of 1780, a neutral undertone, a pKa of +6.8, +4.0, and a slurry pH of 7.7.

EXAMPLE VI

The raw pigment of Example V was acid pH coated in accordance with U.S. Letters Patent 3,146,119, sufficient $TiCl_4$ solution being added to coat the pigment with 1.0 percent by weight hydrous $TiO_2$ and sufficient $Al_2(SO_4)_3$ solution being added to coat the pigment with 1.2 percent by weight hydrous alumina, basis the weight of the pigment. Thus, the coatings were applied essentially the same as in Example V, except that the pigment was not digested before or during the coating treatment.

The coated pigment slurry was filtered and the filter cake washed and dried over night. The dried coated pigment had a tinting strength of 1730, a neutral undertone, and a pKa of $+4.0$, $+3.3$.

EXAMPLE VII

Titanium dioxide was produced by the vapor phase oxidation of $TiCl_4$, the same as in Example V.

The raw titanium oxide pigment had a tinting strength of 1710, an undertone of Brown 2, and a pKa of $-3.3$, $-5.6$.

An aqueous slurry containing 20 percent by weight of the titanium oxide, basis the total weight of the slurry, was prepared and adjusted with $H_2SO_4$ from a pH of 4.1 to a pH of 0.7 at 26° C.

Sufficient $TiCl_4$ solution was then added to coat the $TiO_2$ pigment surface with 1 percent by weight hydrous $TiO_2$ (basis the weight of the pigment) as taught by U.S. Letters Patent 3,146,119 and to adjust the slurry pH to 0.4 within 78 minutes. Simultaneously, with the addition of the $TiCl_4$, the slurry was gradually heated to 85° C.

The slurry was then digested at 81° C. to 86° C. and a pH of 0.4 to 0.5 for 105 minutes.

$Al_2(SO_4)_3$ solution was then added in an amount sufficient to coat the pigment with about 1.2 percent by weight hydrous alumina, basis the weight of the pigment, as taught by U.S. Letters Patent 3,146,119 and to adjust the slurry pH to 0.3. The slurry was further digested at 83° C. for 108 minutes.

The slurry was adjusted to a pH of 4.7 by the addition of 1020 milliliters of a 25 percent by weight NaOH solution and digested at 86° C. for 9 minutes.

The slurry pH was then adjusted to 7.3 by the addition of 88 milliliters of a 25 percent by weight solution of $Na_2CO_3$ and digested at 81° C. for 63 minutes.

The slurry was filtered, the coated pigment filter cake washed free of salts, and dried over night at 55° C.

The dry coated pigment had a tinting strength of 1800, an undertone of Blue 2, a pKa of $+6.8$, $+4.0$, and a slurry pH of 7.7.

EXAMPLE VIII

The raw pigment of Example VII was acid pH coated in accordance with U.S. Letters Patent 3,146,119, sufficient $TiCl_4$ solution being added to coat the pigment with 1.0 percent by weight hydrous $TiO_2$ and sufficient $Al_2(SO_4)_3$ solution being added to coat the pigment with 1.2 percent by weight hydrous alumina, basis the weight of the pigment. Thus, the coatings were applied essentially the same as in Example VII except that the pigment was not digested before or during the coating treatment.

The coated pigment slurry was filtered, the filter cake washed and dried over night.

The dried coated pigment had a tinting strength of 1730, an undertone of Blue 1, and a pKa of $+4.0$, $+3.3$.

Although this invention has been described with particular reference to the production of pigmentary $TiO_2$ from titanium halide, especially a titanium tetrahalide selected from the group consisting of $TiCl_4$, $TiBr_4$ and $TiI_4$, it may be employed in treating other raw metal oxides. The term "metal," as employed herein, is defined as including those elements exhibiting metal-like properties including the metalloids.

Examples, not by way of limitation of metal oxides, which may be treated by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, ytterium, ytterbium, zinc, zirconium, niobium, gallium, antimony, lead, and mercury.

While this invention has been described by reference to specific details of certain embodiments, it will be understood that the invention is not intended to be construed as limited to such details except insofar as they are included in the appended claims.

We claim:

1. A process for reducing the surface activity of raw pigmentary metal oxide produced by vapor phase oxidation of metal halide in the presence of nucleating or rutile-promoting agents, which comprises digesting an aqueous slurry consisting essentially of such oxide at pH levels below 2.0 and at temperatures of from 50° C. to the boiling point of the slurry for a period of time sufficient to reduce the surface activity of the raw metal oxide.

2. A process according to claim 1 wherein the digestion period is for at least thirty minutes.

3. A process which comprises digesting at pH levels below 2.0 and at temperatures of from 50° C. to the boiling point of the slurry an aqueous slurry consisting essentially of raw pigmentary titanium dioxide produced by vapor phase oxidation of titanium tetrahalide selected from the group consisting of titanium tetrachloride, titanium tetrabromide and titanium tetraiodide in the presence of nucleating or rutile-promoting agents for a period of time sufficient to reduce the surface activity of the titanium dioxide.

4. A process according to claim 3 wherein the vapor phase oxidation is conducted in the presence of a member selected from the group consisting of aluminum, silicon, zinc, potassium, boron, thorium, zirconium and compounds thereof.

5. A process for improving the pKa value of raw pigmentary titanium dioxide produced by vapor phase oxidation of titanium tetrahalide selected from the group consisting of titanium tetrachloride, titanium tetrabromide and titanium tetraiodide in the presence of nucleating or rutile-promoting agents, which comprises digesting an aqueous slurry consisting essentially of such titanium dioxide at pH levels below 2.0 and at temperatures of from 50° C. to the boiling point of the slurry for a period of time sufficient to raise the pKa value to at least $+4.0$, $+3.3$.

6. A process for improving the pKa value of pigmentary titanium dioxide produced by vapor phase oxidation of titanium tetrahalide selected from the group consisting of titanium tetrachloride, titanium tetrabromide and titanium tetraiodide in the presence of nucleating or rutile-promoting agents, which comprises digesting an aqueous slurry consisting essentially of raw pigmentary titanium dioxide at pH levels below 2.0 and at temperatures of from 50° C. to the boiling point of the slurry for at least thirty minutes, coating digested titanium dioxide pigment in an aqueous medium with at least one hydrous metal oxide, and recovering titanium dioxide pigment having a pKa value of $+6.8$, $+4.0$.

7. A process for treating raw titanium dioxide pigment produced by vapor phase oxidation of titanium tetrachloride in the presence of nucleating or rutile-promoting agents, which comprises digesting an aqueous slurry consisting essentially of the pigment at a pH of from 0.1 to 0.8 and at temperatures of from 70 to 95° C. for at least thirty minutes and recovering titanium dioxide of reduced surface activity.

8. A process for treating raw titanium dioxide pigment produced by the vapor phase oxidation of titanium tetrachloride in the presence of nucleating or rutile-promoting agents which comprises digesting an aqueous slurry consisting essentially of the pigment at a pH of between 0.1 and 0.8 and at temperatures of from 80° C. to the boiling point of the slurry for at least one hour, adjusting the pH of the digested slurry to between 6.5 and 7.5, further digesting the slurry for at least one hour, filtering the slurry, washing the pigment filter cake, drying and recovering a pigment having a stable pH of between 6.5 and 7.5 in aqueous slurry.

9. A process according to claim 1 wherein the slurry pH during digestion is between 0.1 and 0.8.

10. A process according to claim 1 wherein the metal oxide is titanium dioxide.

11. A process according to claim 1 wherein the metal oxide is pigmentary titanium dioxide that has been produced by vapor phase oxidation of titanium tetrahalide in the presence of at least one metal compound selected from the group consisting of compounds of aluminum, silicon, potassium, zinc, zirconium, thorium and boron.

12. A process according to claim 11 wherein the metal compounds of aluminum, silicon, potassium, zinc, zirconium, thorium and boron are the halides of such metals.

13. A process according to claim 3 wherein the digestion is conducted at temperatures above 80° C. and for a period of at least thirty minutes.

14. A process according to claim 3 wherein, following digestion, the pH of the slurry is adjusted to a pH of from 6.5 to 7.5 with a basic reagent.

15. A process according to claim 14 wherein the basic reagent is ammonia.

16. A process according to claim 6 wherein the digested titanium dioxide pigment is coated with hydrous oxides of aluminum and titanium.

17. A process according to claim 6 wherein the digested titanium dioxide is coated with hydrous oxides of aluminum, titanium and silicon.

References Cited

UNITED STATES PATENTS

| | | | |
|---|---|---|---|
| 3,035,966 | 5/1962 | Siuta | 106—300UX |
| 3,146,119 | 8/1964 | Ritter | 106—300 |
| 3,172,772 | 3/1965 | Rowe | 106—300 |
| 3,251,705 | 5/1966 | Rieck et al. | 106—300 |
| 3,253,889 | 5/1966 | Wildt et al. | 106—300X |
| 3,383,231 | 5/1968 | Allan | 106—300 |
| 2,766,133 | 10/1956 | Marcot et al. | 23—202X |
| 2,999,011 | 9/1961 | Olmsted et al. | 23—202 |
| 3,060,002 | 10/1962 | Leddy et al. | 23—202 |
| 3,410,708 | 11/1968 | McGinnis | 106—308IX |

FOREIGN PATENTS 897,501   5/1962   Great Britain.

TOBIAS E. LEVOW, Primary Examiner

H. M. SNEED, Assistant Examiner

U.S. Cl. X.R.

23—1, 202; 106—288, 296, 297, 303, 304, 308, 309